United States Patent [19]

Winter

[11] Patent Number: 4,980,544
[45] Date of Patent: Dec. 25, 1990

[54] OPTICAL CODE READER AND FORMAT

[75] Inventor: Gary E. Winter, Hanover Park, Ill.

[73] Assignee: Abbott Laboratories, Abbott Park, Ill.

[21] Appl. No.: 492,231

[22] Filed: Feb. 22, 1990

Related U.S. Application Data

[63] Continuation-in-part of Ser. No. 41,187, Apr. 22, 1987, abandoned.

[51] Int. Cl.$^5$ .............................................. G06K 7/00
[52] U.S. Cl. .................................. 235/436; 235/462; 235/494
[58] Field of Search ............... 235/436, 462, 463, 494, 235/466

[56] References Cited

U.S. PATENT DOCUMENTS

| | | | |
|---|---|---|---|
| 3,543,007 | 11/1970 | Brinker et al. | 235/462 X |
| 3,860,794 | 1/1975 | Knockeart et al. | 235/61.11 |
| 3,862,400 | 1/1975 | Thomson | 235/494 X |
| 3,909,594 | 9/1975 | Allais et al. | 235/462 |
| 3,912,943 | 10/1975 | Wilson | 307/235 |
| 3,949,233 | 4/1976 | Gluck | 250/555 |
| 4,158,435 | 6/1979 | Nakanishi et al. | 235/463 |
| 4,162,408 | 7/1979 | Hansen | 250/555 |
| 4,335,301 | 6/1982 | Palmer et al. | 235/462 |
| 4,517,455 | 5/1985 | Benitez, III et al. | 235/463 |
| 4,567,361 | 1/1986 | Rosenthal | 235/462 |
| 4,578,568 | 3/1986 | Tsuzuki | 235/436 |
| 4,740,675 | 4/1988 | Brosnan et al. | 235/462 |

FOREIGN PATENT DOCUMENTS

| | | |
|---|---|---|
| 2330759 | 1/1974 | Fed. Rep. of Germany . |
| 3302775 | 8/1984 | Fed. Rep. of Germany . |

*Primary Examiner*—David L. Trafton
*Attorney, Agent, or Firm*—Richard D. Schmidt; John W. Cornell

[57] ABSTRACT

An optical code reader system includes an optical code reader and a corresponding optical code format. The code reader includes a detector circuit for establishing an adaptive threshold level related to the difference in successive positive and negative peaks of the analog signal corresponding to white and black areas of the code. The code format comprises a plurality of alternating encoded black and white areas bounded by white quiet zones and black preset areas associated with the quiet zones for presetting the threshold value of the detector circuit to a known level before the code is read.

20 Claims, 2 Drawing Sheets

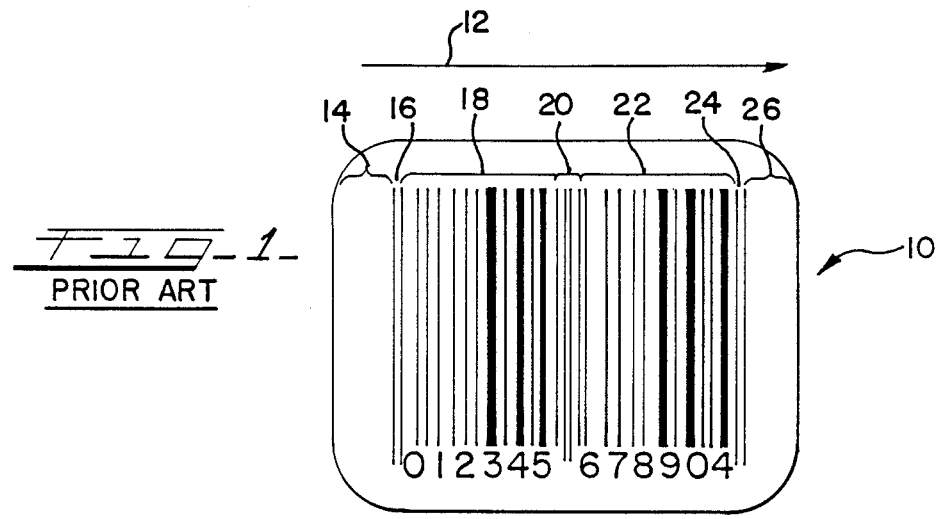
Fig-1-
PRIOR ART
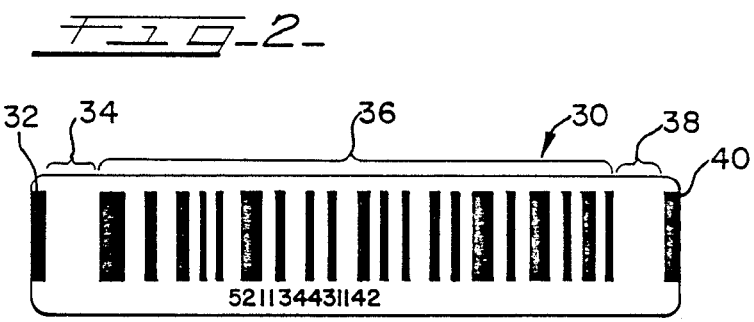
Fig-2-
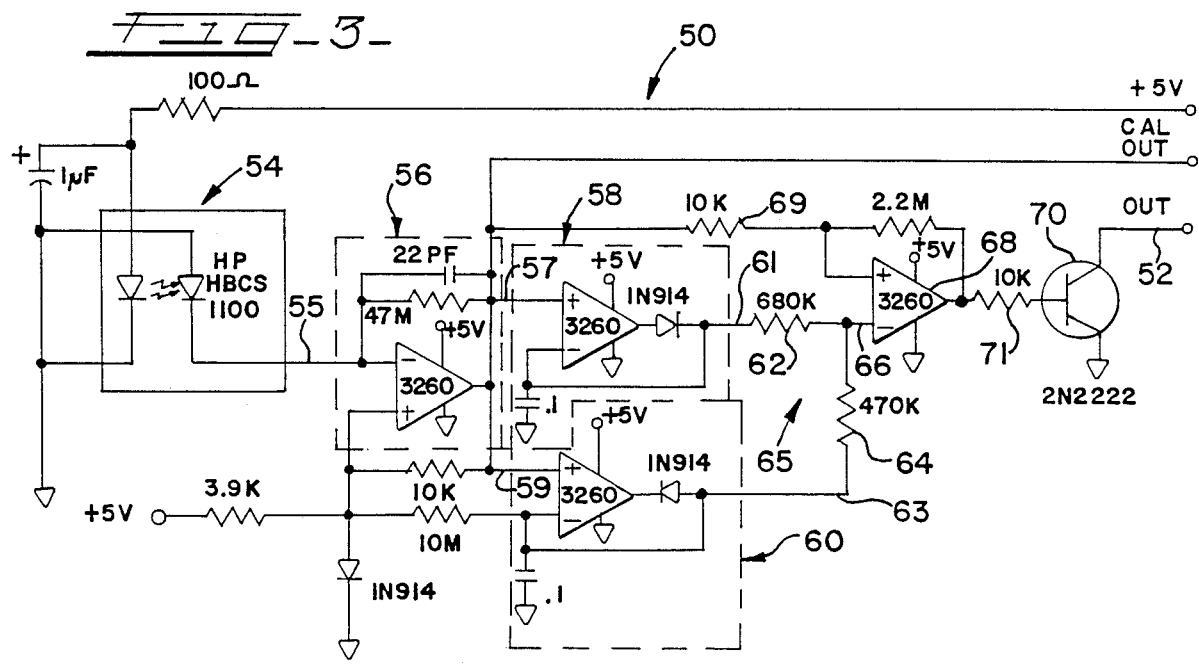
Fig-3-

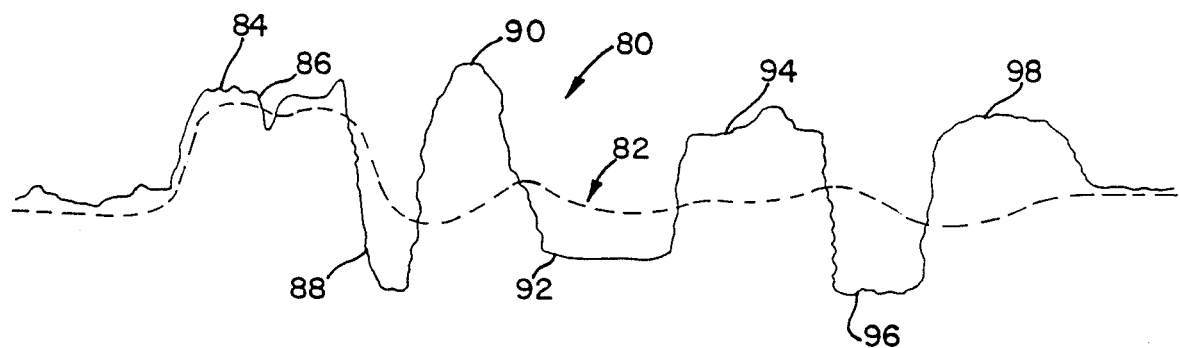
FIG_4a_
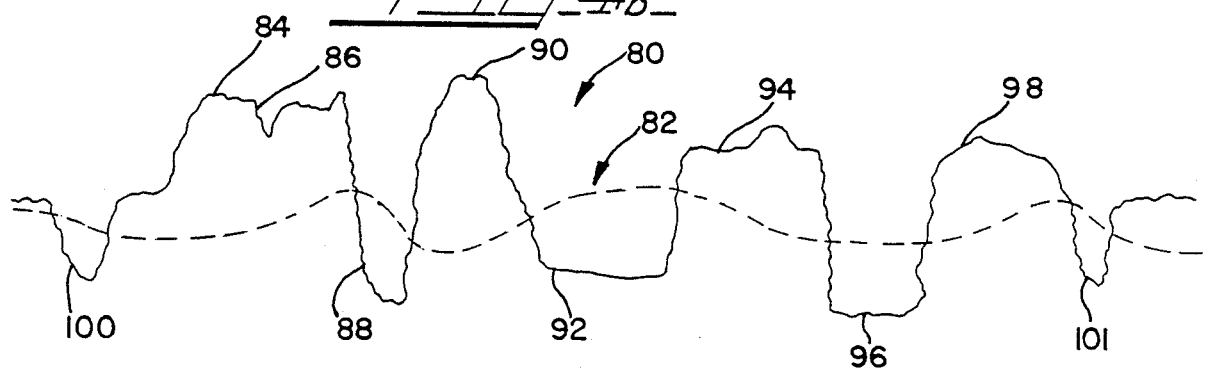
FIG_4b_
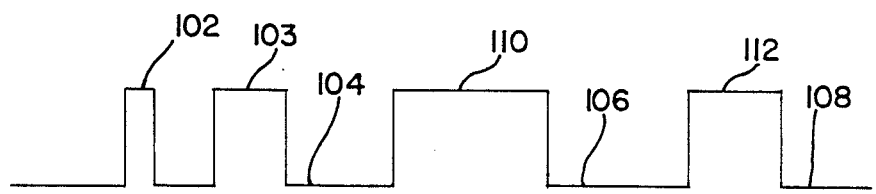
FIG_4c_
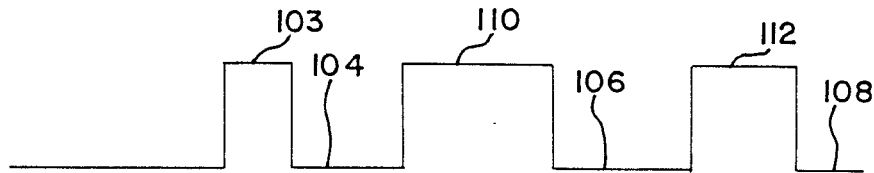
FIG_4d_

OPTICAL CODE READER AND FORMAT

This application is a continuation-in-part of application Ser. No. 041,187, filed Apr. 22, 1987, now abandoned.

BACKGROUND OF THE INVENTION

1. Field of the Invention

This invention relates generally to optical code readers and formats. More specifically, the invention is directed to an optical code reader having an adaptive threshold capability and to a corresponding optical code format that presets the threshold of the reader to a known value.

2. Statement of the Related Art

Optical code readers and optical codes are presently used in many applications wherein it is desirable to identify an item quickly and accurately by a selected code applied thereto. Examples include product and price identification in retail stores, stock identification in inventory applications, and sample or test result and corresponding patient identification in medical applications.

One common type of optical code reader presently in use generally comprises an optical source such as a light emitting diode (LED) that illuminates a code being scanned by the reader or being moved across a stationary reader, an optical detector such as a conventional photodiode or phototransistor that detects the light reflected by the code and converts it into an electrical analog signal, and a detector circuit (also called a discriminator or wave-shaping circuit) that converts the analog signal into digital pulses representative of the code.

A variety of black on white type code formats in which a black pattern is printed on a white or other suitably contrasting background are known in the art. Such code formats include, for example, circular codes and bar codes, such as the widely known and used universal product code (UPC), among others. Black on white codes encode digital data in the alternating black and white areas of the code and some, like the UPC, in the relative widths of the black and white areas. Such code formats also generally include white "quiet zones" which border the code-containing areas.

Known optical detector circuits typically convert the analog signal produced by scanning such a code into digital pulses corresponding to the code by comparing the signal to a threshold level and generating a pulse if the signal is above the threshold and no pulse if the signal is below the threshold, or vice versa depending on the logic employed. Typically, white code areas, having a high degree of light reflectivity, produce signals having relatively high positive peak values, whereas black areas, having a fairly low degree of reflectivity, produce signals having relatively high negative peak values compared to the threshold value.

It has long been known in the optical reader art that the analog signal generated by the optical detector tends to have large amplitude variations both from code to code and within the same code. The reasons for such variations are known to include improper or non-uniform printing of the code, dirt or other foreign substances adhered to the code, non-uniformity of the surface on which the code is printed, variations in distance between the code and the reader, and varying contrast between the code and the background on which it is printed, to name a few.

Such variations present significant problems in accurately detecting and converting the generated analog signal to corresponding digital pulses if a fixed threshold value is used. Accordingly, detector circuits having continuously adaptive thresholds have been developed. Many of such circuits are designed to adjust the threshold as a function of the difference between the values of successive positive and negative peaks which occur in the analog signal during black to white and white to black transitions in the code.

A problem with such adaptive threshold detector circuits is that in the absence of black to white or white to black transitions, the threshold signal tends to float to near the level of the analog signal generated by the optical detector. This situation renders the detector circuit extremely sensitive to even small negative-going excursions of the analog signal which can be readily caused by minor surface imperfections on the code or by vibrations of the optical detector, for example. When reading codes having quiet zones, such as the UPC, the detector circuit is particularly susceptible to read errors caused by dirt or other debris in the quiet zones. Such errors can have dire consequences in critical applications such as identifying medication or test results with a particular patient, for example. Accordingly, it is imperative to prevent such errors.

Thus, it is an object of the invention to provide an optical code reader system which overcomes the limitations and drawbacks identified with the prior art. Specifically, it is an object of the invention to provide an optical code reader system that accurately reads optical codes having error inducing characteristics such as those identified above which cause amplitude variations in the electrical signal representing the code. It is a further object to provide such a system that has an adaptively preset threshold value which further minimizes the occurrence of erroneous readings. It is a still further object to provide such a system wherein a specially designed optical code format cooperates with an optical code reader to adaptively preset the threshold value of the code reader detector circuit.

SUMMARY OF THE INVENTION

The foregoing objects and attendant advantages are obtained by providing an optical code reader system comprising an optical code reader having an adaptive threshold related to the peak levels of an electrical signal corresponding to an optical code, and a corresponding optical code format comprising a code area consisting of a plurality of alternating dark and light areas surrounded by quiet zones, each quiet zone having associated therewith a preset area which when encountered by the code reader adaptively presets the threshold value to a known level.

BRIEF DESCRIPTION OF THE DRAWINGS

The novel features that are believed to be characteristic of the invention are set forth in the appended claims. The invention itself, together with the foregoing objects and attendant advantages thereof, will be best understood by reference to the following detailed description of the presently preferred embodiment thereof, taken in conjunction with the drawing, in which:

FIG. 1 illustrates a prior art bar code in the conventional UPC format;

FIG. 2 illustrates a bar code embodying the optical code format of the invention;

FIG. 3 is a schematic diagram illustrating the details of an optical code reader circuit including an adaptive threshold detector circuit which suitably forms part of the system of the invention;

FIGS. 4a and 4c are corresponding timing diagrams illustrating the problematic effect of the prior art bar code of FIG. 1 on the circuit of FIG. 3; and FIGS. 4b and 4d are corresponding timing diagrams illustrating the advantageous effect of the optical code format of the invention on the circuit of FIG. 3.

DETAILED DESCRIPTION OF THE PRESENTLY PREFERRED EMBODIMENT

Referring to the drawing, FIG. 1 illustrates an example of a typical prior art optical bar code 10 in the conventional UPC format. Typically, the bar code 10 would be scanned by an optical code reader from left to right as shown by arrow 12. This type of code format typically comprises from left to right a first white quiet zone 14, a pair of start bars 16, a first code area 18 consisting of a plurality of encoded black and white bars, a pair of separation bars 20, a second code area 22 consisting of a second plurality of encoded black and white bars, a pair of stop bars 24, and a second white quiet zone 26. Variations on this format may or may not contain parity codes as well as data codes in the code areas 18 and 22. Also, some format variations may not employ start, separation, and stop bars 16, 20, and 24 respectively. However, typically this type of code format and variations thereon include a least one code area bounded by white quiet zones such as quiet zones 14 and 26.

FIG. 2 illustrates an example of an optical bar code 30 in a format comprising a preferred embodiment of an aspect of the invention. The bar code 30 comprises from left to right a black reference or threshold setting bar 32, a first white quiet zone 34, a code area 36 consisting of a plurality of encoded black and white bars, a second white quiet zone 38, and a second black reference or threshold setting bar 40. The code area 36 may contain one or more parity codes as well as encoded data. In addition, the code area may contain start, separation, and stop bars (not shown) similar to those illustrated in FIG. 1, if desired. Although the code format of the invention is illustrated in a preferred bar code format, it is understood that the code format can also be embodied in other code types such as circular codes, for example. It is also understood that the code area 36 can be encoded in the UPC format or any other desired format.

FIG. 3 illustrates an optical code reader circuit 50 that comprises a preferred embodiment of an aspect of the invention. The preferred components and component values of the circuit are as illustrated in the figure. The optical code reader circuit 50 comprises a photodiode 54 the output of which is connected to the input of a current to voltage amplifier 56 by a line 55. The output of the amplifier 56 is connected in parallel to the input of a positive signal peak detector 58 by a line 57 and to the input of a negative signal peak detector 60 by a line 59. The outputs of the positive and negative peak detectors 58 and 60 are connected to opposite ends of a voltage divider 65 comprised of resistors 62 and 64 by lines 61 and 63 respectively. The output 66 of the voltage divider 65 is connected to one input of a comparator 68. The other input of the comparator 68 is connected to the output of the current to voltage amplifier 56 through a resistor 69. The output of the comparator 68 is connected to the base of a bipolar NPN transistor 70 by a resistor 71. The emitter of the transistor 70 is connected to ground and the collector to an output line 52.

In operation, the optical code reader circuit 50 converts the encoded black and white bars or other encoded areas of an optical code such as the codes 10 and 30 into a corresponding train of TTL logic level digital pulses representative of the code at the output 52. As the photodiode 54 of the optical code reader circuit 50 is scanned across an optical code such as the code 10 illustrated in FIG. 1, or as the code 10 is moved past the photodiode 54 if the reader is stationary, the photodiode 54 generates an analog current related to the intensity of the light reflected by the code 10 on line 55. The amplifier 56 converts this current into a corresponding analog voltage signal having a series of positive-going and negative-going peaks corresponding to the white and black areas of the code respectively on lines 57 and 59. The positive peak detector 58 detects the positive or white peaks of the signal and the negative peak detector 60 detects the negative or black peaks. The positive and negative peak detectors 58 and 60 apply the positive and negative peaks to opposite ends of the voltage divider 65 as described above. The voltage divider 65 generates an output signal which varies with the levels of the white and black peaks and which provides an adaptive threshold value for the comparator 68. In the preferred embodiment, the voltage divider sets the threshold value at approximately 65% of the difference between successive black and white peaks below the white peak level. The comparator 68 compares the analog voltage signal generated by the amplifier 56 with the adaptive threshold voltage and triggers the transistor 70 into conduction when the analog signal is greater than the threshold. Otherwise the transistor 70 is non-conductive. When the transistor 70 is non-conductive, the signal on the output 52 is a high TTL level signal and when the transistor is conductive, the signal is a low TTL level signal. Thus, the preferred circuit 50 generates a low TTL level output signal when the analog signal is above the threshold which corresponds to white areas of the code and a high TTL level signal when the analog signal is below the threshold which corresponds to black areas of the code. Alternatively, the comparator 68 can be configured to provide high TTL level output pulses corresponding to white areas and low TTL level pulses corresponding to black areas of the code, if desired. Since the transistor 70 switches on and off very rapidly compared to the comparator 68, the output signals essentially have square edges. In addition, the duration of the low and high output signals correspond essentially to the width of the respective white and black encoded bars or other encoded areas.

It should be apparent from the foregoing description that when a prior art optical code such as the code 10 of FIG. 1 is read, the adaptive threshold level applied to the comparator 68 is initially set by the first white peak to black peak transition of the analog signal which results from the transition from the first white quiet zone 14 to the first start bar 16. Thereafter, the threshold 82 is adaptively adjusted by each white peak to black peak and black peak to white peak transition, i.e., each white to black and black to white transition of the code. When no transition is occurring, the threshold level tends to travel exponentially toward the value of the analog signal. Thus, before the code is read, when no transitions are occurring, the threshold level tends to float slightly below the level of the analog signal. This situation renders the circuit 50 very sensitive to negative going excursions in the analog signal. Such excursions are easily caused by dirt or smudging in the quiet zone of the code or even by vibration of the photodiode 54, for example, and can easily be large enough to drop below the threshold and cause the transistor 70 to output spurious pulses which may be erroneously interpreted as part of the code. It is understood that this situation is not particular to the preferred optical code reader circuit 50 described but is also present in many other optical code reader circuits of the type that adaptively set the threshold value as a function of the values of the white and black peaks and that rely on white to black and black to white transitions to set the threshold. Moreover, the problem occurs in both analog and digital adaptive threshold circuits of this type.

FIGS. 4a and 4c are timing diagrams which illustrate the effect of the above situation on the output of the optical code reader circuit 50. As a typical prior art optical code is read, the analog voltage signal is generated having a series of positive peaks 84, 90, 94, and 98 corresponding to white code areas, and negative peaks 88, 92, and 96 corresponding to black code areas. The threshold 82 tends to adjust toward a level that is approximately 65% of the difference between successive white and black peaks below the white peak level. When the analog signal 80 is above the threshold 82, low logic signals 104, 106, and 108 corresponding to the white areas of the code are output by the circuit 50. When the analog signal 80 is below the threshold 82, high level logic signals 110, 112 corresponding to the black areas of the code are output. Prior to reading the code and before any black to white or white to black transitions occur, the reference level 82 tends to float slightly below the analog signal 80. During the white peak 84 corresponding to the first quiet zone 14, dirt or other debris, for example can cause a negative dip 86 in the analog signal 80. Since the threshold level 82 is floating just below the analog signal 80, the dip can cause a spurious output pulse 102 to be generated which can be erroneously interpreted as part of the code.

FIGS. 4b and 4d are timing diagrams which illustrate the curative effect of the code format 30 embodying the present invention on the output of the optical code reader circuit 50. It is understood that in this example the circuit 50 is representative of all such circuits having adaptive threshold circuits of the type described above. The analog voltage signal represented in FIG. 4b is the same as that represented in FIG. 4a except that an initial negative peak 100 corresponding to the first black threshold setting bar 32 and a final negative peak 101 corresponding to the second black threshold setting bar 40 are introduced into the signal as the code is read. The introduction of the black peak 100 corresponding to the setting bar 32 prior to the white peak corresponding to the first white quiet zone 14 presets the threshold 82 to a known level having the 65% value described above. As a result, the negative dip 86 encountered during the white peak 86 does not approach the threshold and does not cause an erroneous pulse in the output signal. The second threshold setting bar 40 is included so that the threshold will be preset as described above regardless of which direction the bar code 30 is read in.

In the preferred embodiment, it has been found that in the absence of black to white or white to black transitions, the threshold level tends to decay toward the analog signal level such that by about 50 milleseconds after the last transition the threshold level has decayed to about one half of the initial difference between the analog signal and the threshold value. As an example, therefore, positioning the first black threshold setting bar 32 approximately 0.25 inches before the beginning of the code area 36 and scanning the code at a rate of approximately five inches per second, a negative-going excursion in the analog signal would require a magnitude of approximately one half the initial difference between the analog voltage signal and the threshold value to cause any effect on the output of the circuit 50. However, spurious signals caused by dirt, vibration and other surface imperfections normally do not produce excursions having magnitudes of this level. Accordingly, the preferred optical code reader system embodying the invention minimizes the effect of such imperfections on the output of the circuit 50 and effectively solves the floating threshold problem inherent in many adaptive threshold optical code readers of the type described.

What have been described are certain aspects of an optical code reader system comprising a presently preferred embodiment of the invention. It is understood that the foregoing description and accompanying illustrations are merely exemplary and that the scope of the invention is defined solely by the appended claims. Various changes and modifications to the preferred embodiment will be apparent to those skilled in the art. Such changes and modifications may include, but are not limited to embodying the preferred code format in other types of codes such as circular codes, or alternate color schemes such as white on black or black on red, etc. Such changes and modifications can be made without departing from the spirit or scope of the invention. Accordingly, it is intended that all such changes and modifications and all other equivalents be covered by the appended claims.

I claim:

1. An optical code reader system, comprising:
    optical code reader means for converting an optical code into a corresponding digital signal, said optical code reader means having means for converting said optical code into at least one corresponding electrical signal, means for generating an adaptive threshold related to said signal, and means for generating said digital signal so that said digital signal has a first state when said signal is above said threshold value and a second state when said signal is below said threshold value; and
    a corresponding optical code for being read by said optical code reader, said optical code comprising a plurality of alternating encoded black and white areas, said areas being bounded on at least one side by a substantially white quiet zone, and at least one black preset area associated with said white quiet zone for presetting said threshold to a known value when encountered by said optical reader.

2. The optical code reader system defined in claim 1 wherein said optical code reader means comprises optical bar code reader means, and wherein said corresponding optical code comprises a corresponding optical bar code.

3. The optical code reader system defined in claim 1 wherein said means for converting said optical code into at least one corresponding electrical signal comprises means for converting said code into at least one signal having a positive-going peak corresponding to each white code area and a negative-going peak corresponding to each black code area.

4. The optical code reader system defined in claim 3 wherein said means for generating an adaptive threshold related to said signal comprises means for generating an adaptive threshold related to the difference between successive positive-going and negative-going peaks of said signal.

5. The optical code reader system defined in claim 1 wherein said optical code comprises a plurality of alternating encoded black and white areas being bounded on at least one side by a first substantially white quiet zone, and on at least one opposite side by a second substantially white quiet zone, said code further comprising at least one first black preset area associated with said first white quiet zone for presetting said threshold to a known value before said first quiet zone and encoded areas are read in a first direction by said optical code reader means, and at least one second black preset area associated with said second white quiet zone for presetting said threshold to a known value before said second quiet zone and encoded areas are read by said optical code reader means in a second direction.

6. In an optical code reader system having conventional optical code reader means for converting an optical code into a corresponding digital signal, said optical code reader means having means for converting said optical code into at least one corresponding electrical signal, means for generating an adaptive threshold related to said signal, and means for generating said digital signal so that said digital signal has a first state when said signal is above said threshold value and a second state when said signal is below said threshold value, the improvement comprising:
said optical code comprising a plurality of alternating encoded black and white areas, said areas being bounded on at least one side by a substantially white quiet zone, and at least one black preset area associated with said white quiet zone for presetting said threshold to a known value when encountered by said optical reader means.

7. The optical code reader system defined in claim 6 wherein said optical code comprises a plurality of alternating encoded black and white areas being bounded on at least one side by a first substantially white quiet zone, and on at least one opposite side by a second substantially white quiet zone, said code further comprising at least one first black preset area associated with said first white quiet zone for presetting said threshold to a known value before said first quiet zone and encoded areas are read by said optical code reader means in a first direction, and at least one second black preset area associated with said second white quiet zone for presetting said threshold to a known value before said second quiet zone and encoded areas are read by said optical code reader means in a second direction.

8. An optical code for being read by optical code reader means, comprising:
code means comprising a plurality of alternating encoded black and white areas, said areas being bounded on at least one side by a substantially white quiet zone, and threshold preset means comprising at least one black preset area associated with said white quiet zone for causing said generating means to preset said adaptive threshold to a known value.

9. The optical code defined in claim 8 wherein said code means comprises bar code means.

10. The optical code defined in claim 8 wherein said code means comprises a plurality of alternating encoded black and white areas being bounded on at least one side by a first substantially white quiet zone, and on at least one opposite side by a second substantially white quiet zone, said code means further comprising at least one first black preset area associated with said first white quiet zone for presetting said threshold to a known value before said first quiet zone and encoded areas are read by said optical code reader means in a first direction, and at least one second black preset area associated with said second white quiet zone for presetting said threshold to a known value before said second quiet zone and encoded areas are read by said optical code reader means in a second direction.

11. An optical code reader system, comprising:
optical code reader means for converting an optical code into a corresponding digital signal, said optical code reader means having means for converting said optical code into at least one corresponding electrical signal, means for generating an adaptive threshold related to said signal, and means for generating said digital signal so that said digital signal has a first state when said signal is above said threshold value and a second state when said signal is below said threshold value; and
a corresponding optical code for being read by said optical code reader, said optical code comprising a plurality of alternating encoded dark and light areas, said areas being bounded on at least one side by a quiet zone, and at least one non-encoded preset area associated with said quiet zone for presetting said threshold to a known value when encountered by said optical reader.

12. The optical code reader system defined in claim 11 wherein said optical reader means comprises optical bar code reader means, and wherein said corresponding optical code comprises a corresponding optical bar code.

13. The optical code reader system defined in claim 11 wherein said means for converting said optical code into at least one corresponding electrical signal comprises means for converting said code into at least one signal having a positive-going peak corresponding to each light code area and a negative-going peak corresponding to each dark code area.

14. The optical code reader system defined in claim 13 wherein said means for generating an adaptive threshold related to said signal comprises means for generating an adaptive threshold related to the difference between successive positive-going and negative-going peaks for said signal.

15. The optical code reader system defined in claim 11 wherein said optical code comprises a plurality of alternating encoded dark and light areas being bound on at least one side by a first quiet zone, and on at least one opposite side by a second quiet zone, said code further comprising at least one first non-encoded preset area associated with said first quiet zone for presetting said threshold to a known value before said first quiet zone and encoded areas are read in a first direction by said optical code reader means, and at least one second non-encoded preset area associated with said second quiet zone for presetting said threshold to a known value before said second quiet zone and encoded areas are read by said optical code reader means in a second direction.

16. In an optical code reader system having conventional optical code reader means for converting an optical code into a corresponding digital signal, said optical code reader means having means for converting said optical code into at least one corresponding electrical signal, means for generating an adaptive threshold related to said signal, and means for generating said digital signal so that said digital signal has a first state when said signal is above said threshold value and a second state when said signal is below said threshold value, the improvement comprising:

said optical code comprising a plurality of alternating encoded dark and light areas, said areas being bounded on at least one side by a quiet zone, and at least one non-encoded preset area associated with said quiet zone for presetting said threshold to a known value when encountered by said optical reader means.

17. The optical code reader system defined in claim 16 wherein said optical code comprises a plurality of alternating encoded dark and light areas being bounded on at least one side by a first quiet zone, and on at least one opposite side by a second quiet zone, said code further comprising at least one first non-encoded preset area associated with said first quiet zone for presetting said threshold to a known value before said first quiet zone and encoded areas are read by said optical code reader means in a first direction, and at least one second non-encoded preset area associated with said second quiet zone for presetting said threshold to a known value before said second quiet zone and encoded areas are read by said optical code reader means in a second direction.

18. An optical code for being read by optical code reader means, comprising:

code means comprising a plurality of alternating encoded black and white areas, said areas being bounded on at least one side by a quiet zone, and threshold preset means comprising at least one non-encoded preset area associated with said quiet zone for causing said generating means to preset said adaptive threshold to a known value.

19. The optical code defined in claim 18 wherein said code means comprises bar code means.

20. The optical code defined in claim 18 wherein said code means comprises a plurality of alternating encoded black and white areas being bounded on at least one side by a first quiet zone, and on at least one opposite side by a second substantially quiet zone, said code means further comprising at least one first non-encoded preset area associated with said first quiet zone for presetting said threshold to a known value before said first quiet zone and encoded areas are read by said optical code reader means in a first direction, and at least one second non-encoded preset area associated with said second quiet zone for presetting said threshold to a known value before said second quiet zone and encoded areas are read by said optical code reader means in a second direction.

* * * * *